US010552394B2

United States Patent
Liu et al.

(10) Patent No.: US 10,552,394 B2
(45) Date of Patent: Feb. 4, 2020

(54) DATA STORAGE WITH IMPROVED EFFICIENCY

(71) Applicant: INTERNATIONAL BUSINESS MACHINES CORPORATION, Armonk, NY (US)

(72) Inventors: Liang Liu, Beijing (CN); Zhuo Liu, Beijing (CN); Jun Mei Qu, Beijing (CN); Hong Zhou Sha, Beijing (CN); Wen Jun Yin, Beijing (CN); Wei Zhuang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 15/697,679

(22) Filed: Sep. 7, 2017

(65) Prior Publication Data

US 2019/0073390 A1  Mar. 7, 2019

(51) Int. Cl.
*G06F 16/22* (2019.01)
*G06F 16/21* (2019.01)
*G06F 16/23* (2019.01)
*G06F 16/185* (2019.01)

(52) U.S. Cl.
CPC .......... *G06F 16/22* (2019.01); *G06F 16/185* (2019.01); *G06F 16/211* (2019.01); *G06F 16/2358* (2019.01)

(58) Field of Classification Search
CPC combination set(s) only.
See application file for complete search history.

(56) References Cited

U.S. PATENT DOCUMENTS

| 8,892,599 | B2 | 11/2014 | Lindblad et al. |
| 9,886,483 | B1* | 2/2018 | Harrison ................. G06F 16/28 |
| 2002/0065795 | A1* | 5/2002 | Asherman ........... H04L 67/2842 |
| 2014/0351233 | A1* | 11/2014 | Crupi ................ G06F 16/24568 |
| | | | 707/706 |
| 2016/0092548 | A1 | 3/2016 | Shivarudraiah et al. |
| 2016/0188677 | A1 | 6/2016 | Murthy et al. |
| 2016/0342304 | A1* | 11/2016 | Kodavali ............ G06F 3/04817 |
| 2017/0139914 | A1* | 5/2017 | Newman ................. H04L 51/04 |

FOREIGN PATENT DOCUMENTS

CN          106326381 A      1/2017

* cited by examiner

*Primary Examiner* — Shyue Jiunn Hwa
(74) *Attorney, Agent, or Firm* — Jordan T. Schiller

(57) ABSTRACT

This disclosure provides a computer-implemented method for data storage in a non-relational database. The method comprises receiving a data item to be inserted into a table in the non-relational database. The method further comprises determining a dynamic data section and a static data section of the received data item. The method further comprises in response to the static data section not existing in the static data storage area, storing the static data section in the static data storage area. The method further comprises storing the dynamic data section in the dynamic data storage area.

19 Claims, 7 Drawing Sheets

| ID | StationName | Province | City | County | Lon | Lat | TimeStamp | PM2.5Value |
|---|---|---|---|---|---|---|---|---|
| 1 | DongSi | BeiJing | BeiJing | DongCheng | 116.4 | 39.9 | 2017-06-26 00:00:00 | 30 |
| 2 | DongSi | BeiJing | BeiJing | DongCheng | 116.4 | 39.9 | 2017-06-26 01:00:00 | 32 |
| 3 | ShiJiPark | Hebei | CangZhou | HeJian | 114.5 | 38.1 | 2017-06-26 00:00:00 | 33 |
| 4 | ShiJiPark | Hebei | CangZhou | HeJian | 114.5 | 38.1 | 2017-06-26 01:00:00 | 34 |

Fig. 2A

Table 1

| ID | StationName | Province | City | County | Longitude | Latitude |
|---|---|---|---|---|---|---|
| 1 | DongSi | BeiJing | BeiJing | DongCheng | 116.417 | 39.929 |
| 2 | ShiJiPark | Hebei | CangZhou | HeJian | 114.542 | 38.031 |

Table 2

| ID | TimeStamp | PM2.5Value |
|---|---|---|
| 1 | 2017-06-26 00:00:00 | 30 |
| 1 | 2017-06-26 01:00:00 | 32 |
| 2 | 2017-06-26 00:00:00 | 33 |
| 2 | 2017-06-26 01:00:00 | 34 |

Fig. 2B

| Row Key | Column family-1 | | Column family-2 | | | Column family-3 |
|---|---|---|---|---|---|---|
| | Column 1 | Column 2 | Column 1 | Column 2 | Column 3 | Column 1 |
| Key 1 | T1:abc T2:gdxdf | | T4:dfads T3:hello T2:world | | | |
| Key 2 | T3:abc T1:gdxdf | | T4:dfads T3:hello | | T2:dfdsfa T3:dfdf | |
| Key 3 | | T2:dfadfa T1:dfdasd | | | | T2:dfxx T1:xxx.com |

Fig. 3

| Row Key | ColumnFamily1 | | | ColumnFamily2 |
|---|---|---|---|---|
| | Lon | Lat | ID | PM25Value |
| Beijing-Beijing-Dongcheng-DongSi | 116.417 | 39.929 | 1 | |
| Hebei-CangZhou-HeJian-Shiji iPark | 114.542 | 38.031 | 2 | |
| 2017-06-26 00:00:00-1 | | | | 30 |
| 2017-06-26 00:00:00-2 | | | | 33 |
| 2017-06-26 01:00:00-1 | | | | 32 |
| 2017-06-26 01:00:00-2 | | | | 34 |

Fig. 6

DATA STORAGE WITH IMPROVED EFFICIENCY

BACKGROUND

The present invention relates to data storage in a non-relational database, and more specifically, to data storage in a non-relational database through a static data storage area and a dynamic data storage area belonging to a same table.

With the rapid development of artificial intelligence (AI) technology, big data analysis has become a common demand nowadays. Data analysis is an important enabling technology in almost all AI and cognitive computing solutions across various industries. Databases and high efficiency data storage is a key factor to improve and speed up data analytics and data access. Database tables are generally used in storing collected data. Data queries can then be raised to search out required data from the database tables.

With the rapid growth of amount of collected and stored data, there are significant amounts of data items with the same data values being repeatedly stored in databases which, unavoidably, takes up a large amount of data storage resources. For example, to implement analysis and prediction on air quality, data collected by deployed sensors around various monitoring points (e.g. 200 sensors around a given area) in a city need to be collected and stored every hour. Each data item reported by each sensor, every hour, may be stored in a row in a database table as raw data. For example, each data row may contain the following columns: province name, city name, station name, time, PM2.5 value and so on. The values of province name, city name, and station name are the same for many data rows and need to be repeatedly stored in a data table, which may cause significant redundancy of data storage.

A traditional way to solve this problem is to separate the data items into two tables. One table is used to store those data items with fixed values, for example, the city name, the station name, the province name, etc. Another table is used to store those data items with dynamic values, for example, the PM 2.5 value per hours. The two tables can be connected through unique IDs. In this way, the data with fixed values may be stored only once in the first table, so the data redundancy in a database system can be reduced.

SUMMARY

According to one embodiment of the present invention, there is provided a computer-implemented method for data storage in a non-relational database. The method comprises receiving a data item to be stored in the non-relational database. The method further comprises determining a dynamic data section and a static data section of the received data item. The method further comprises storing the static data section in a static data storage area, in response to the static data section not existing in the static data storage area of the non-relational database. The method further comprises storing the dynamic data section in a dynamic data storage area, wherein the dynamic data storage area and the static data storage area belong to a same table in the non-relational database.

According to another embodiment of the present invention, there is provided a system for data storage in a non-relational database. The system comprises one or more processors, a memory coupled to at least one of the one or more processors and a set of computer program instructions stored in the memory and executed by at least one of the one or more processors in order to perform some actions. The actions comprise receiving a data item to be stored in the non-relational database. The actions further comprise determining a dynamic data section and a static data section of the received data item. The actions further comprise storing the static data section in a static data storage area, in response to the static data section not existing in the static data storage area of the non-relational database. The actions further comprise storing the dynamic data section in a dynamic data storage area, wherein the dynamic data storage area and the static data storage area belong to a same table in the non-relational database.

According to another embodiment of the present invention, there is provided a computer program product for data storage in a non-relational database. The computer program product comprises a computer readable storage medium having program instructions embodied therewith and the program instructions are executable by a device to perform a method. The method comprises receiving a data item to be stored in the non-relational database. The method further comprises determining a dynamic data section and a static data section of the received data item. The method further comprises storing the static data section in a static data storage area, in response to the static data section not existing in the static data storage area of the non-relational database. The method further comprises storing the dynamic data section in a dynamic data storage area, wherein the dynamic data storage area and the static data storage area belong to a same table in the non-relational database.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 2A shows an exemplary database table with data redundancy;

FIG. 2B shows an example of two database tables by separating static and dynamic data sections based on the table in FIG. 2A;

FIG. 3 shows an exemplary standard format of a data table in HBase;

FIG. 6 shows an exemplary refined table that is generated based on the original table in FIG. 2A in a non-relational database, according to embodiments of the present invention.

DETAILED DESCRIPTION

A relational database and a non-relational database are two types of databases. A traditional relational database is based on a relational data model. A non-relational database (e.g. HBase and Mongo DB) are currently widely used to process non-formatted data, like texts and pictures, and address high volumes of data reading and writing in parallel.

The above-mentioned solution which separates static and dynamic data sections into two separate tables can be used in traditional relational databases to solve the problem of data redundancy. However, storing data in multiple tables, by separating dynamic data sections and static data sections, will require extra storage because additional storage is needed to maintain additional tables in a database.

Another solution could be directly migrating the above-mentioned solution from a relational database to a non-relational database. However, this direct migration may cause many problems. Firstly, SQL query used in relational database has been optimized to handle the operation of join among tables, while the query in the non-relational database for multiple tables is significantly worse than that for a single table, in view of the performance. Further, the non-relational database, such as HBase, is often deployed in a distributed environment, which has master-slave architecture. In that case, HBase regional servers (slaves) need to first return preliminary results, based on the static data table, back to an HBase master. Secondly, the HBase regional servers will further return results, based on the dynamic data table, back to the HBase master because the data is stored in two different tables. In other words, there will be multiple back and forth communications between the HBase master and the distributed HBase regional servers, which will affect the performance of database query processing. This is called master-slave architecture adopted in a distributed non-relational database.

Therefore, there is a demand for a solution that can be used in a non-relational database to reduce data redundancy while improving the efficiency of data query processing.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
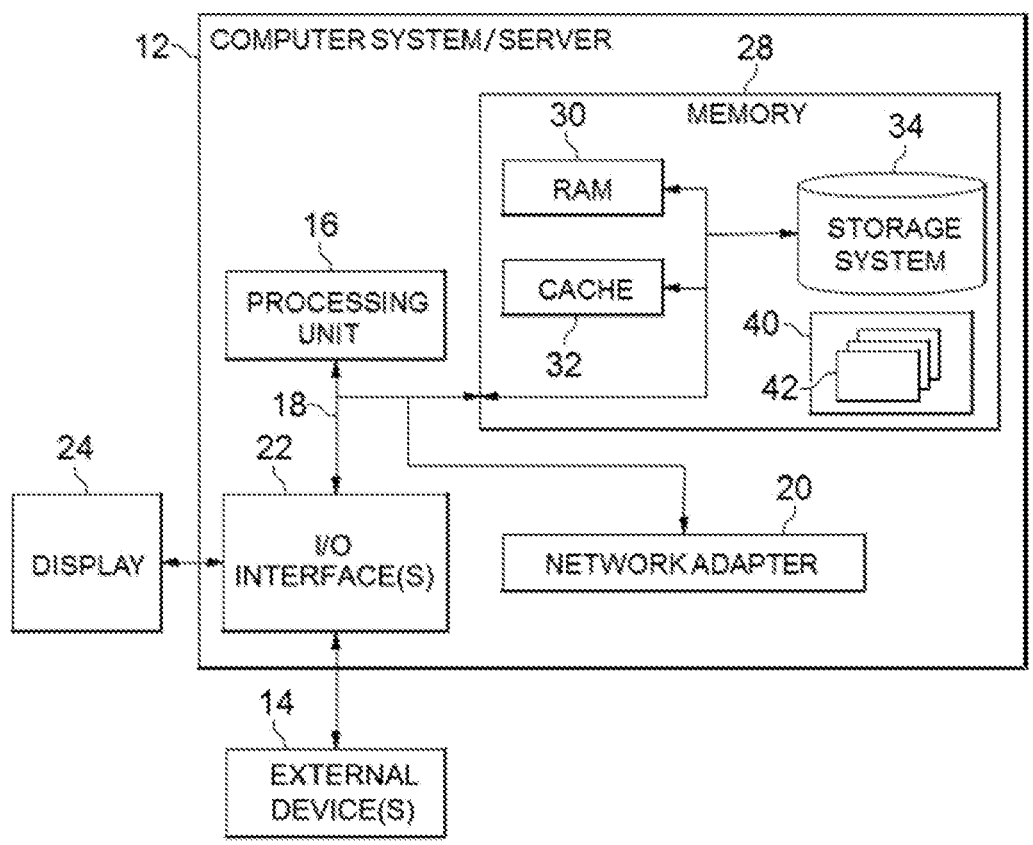
FIG. 1 shows an exemplary computer system which is applicable to implement the embodiments of the present invention.

Referring now to FIG. 1, in which an exemplary computer system/server 12 which is applicable to implement the embodiments of the present invention is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

With reference now to FIG. 2A that shows an exemplary database table with data redundancy. It can be seen from FIG. 2A that the original table recording PM2.5 values in multiple stations comprises 4 rows corresponding to 4 collected data items. Wherein, the first row and the second row correspond to station name "DongSi", and the third row and the fourth row correspond to station name "ShijiPark". In the original table, there are 9 data columns, namely "ID", "StationName", "Province", "City", "County", "Lon (longitude)", "Lat (latitude)", "TimeStamp", and "PM2.5Value". It can be seen from the original table that values of the columns "StationName", "Province", "City", "County", "Lon", and "Lat" may repeat as time goes on, so we call them static data sections. The values of the columns "TimeStamp" and "PM2.5Value" may change as time goes on, so we call them dynamic data sections. The static data sections are repeatedly stored in the original table, which wastes a huge amount of data storage space.

With reference now to FIG. 2B that shows an example of two database tables by separating static and dynamic data sections based on the original table in FIG. 2A. It can be seen from FIG. 2B that Table 1 contains only all static data sections that repeat in the original table, which caused data redundancy. Table 2 contains only all dynamic data sections that change in the original table as time goes on. Table 1 and Table 2, shown in FIG. 2B, are connected through the "ID" column. By separating dynamic data and static data into two tables, the data redundancy has been reduced because all of the static data sections are only stored once in Table 1 in FIG. 2B, instead of being stored twice in the original table as shown in FIG. 2A. This is now a solution widely used in relational databases. As mentioned above, this existing solution may still cause additional storage because multiple tables are created. Further, in the case of a non-relational database, which is generally deployed as a distributed database system, the situation will get worse because back and forth communications between master and slaves are needed as the data is stored in multiple tables.

In view of the shortcomings of data redundancy and directly migrating the existing solution, used in relational database to non-relational database, there is a need for a new data storage schema for non-relational database that could reduce the data redundancy while avoiding the back and forth communications between master and slaves in distributed non-relational database environments when processing a data query.

Now the main idea of the present invention will be described. Those skilled in the art shall understand that a row key, which can be a primary key to retrieve each data record (row), is used to uniquely identify each data row in a non-relational database (e.g. HBase, MongoDB or others).

For example, FIG. 3 shows a standard format of a table in HBase. In FIG. 3, each data row in the table has a unique row key through which the row can be identified. The columns in the table, shown in FIG. 3, are categorized into column families and each of the column families may contain one or more columns. This is a standard format of a data table stored in Hbase, as known to one of ordinary skill in the art. The row keys in Hbase may be any string with a pre-defined format (the maximum length of the string for row keys can be 64 KB, and 10-100 Bytes can be used in practice) but all the string-type row keys for all data rows shall have a same format, though the specific content of the row keys may be different.

Based on the recognition and understanding of the features of row keys in a non-relational database, the present invention considers to define the format of string-type row keys, use these string-type row keys with the defined format to separate the single table into a static data storage area and a dynamic storage area, and store the static data section of each data record into the static data storage area and the dynamic data section of each data record into the dynamic data storage area, respectively.

According to the standard format of a table in HBase, as depicted in FIG. 3, there is no separation of static data sections and dynamic data sections. The present invention separates a single table into dynamic data sections and static data sections, wherein the static data sections have constant data values and the dynamic data sections have variable data values. An important aspect is that both the dynamic data storage area and the static data storage area belong to a single table, rather than two or more tables. Each time a new data item is to be inserted into the table, it may first be determined whether the row key of its static data section already exists in the table. If so, the static data section of the new data item does not need to be stored again. Only the dynamic data section of the new data item will be stored in the dynamic data storage area in the table.

On the contrary, if the row key of the static data section, for the new data item, does not exist in the table, a new row key for storing the static data section of the data item will first be created in the static data storage area of the table, and the static data section of the new data item will be stored in the static data storage area of the table for the first time. The dynamic data section of the data item will also be stored in the dynamic data storage area of the table. Since the string-type row keys of each row in the dynamic data storage area and the static data storage area, in the same table, use the same pre-defined string format and ID for identification of each data row in the static data storage area to associate the static data storage area and the dynamic data storage area, data query may be correctly processed later based on the new data table.

Figure 4:
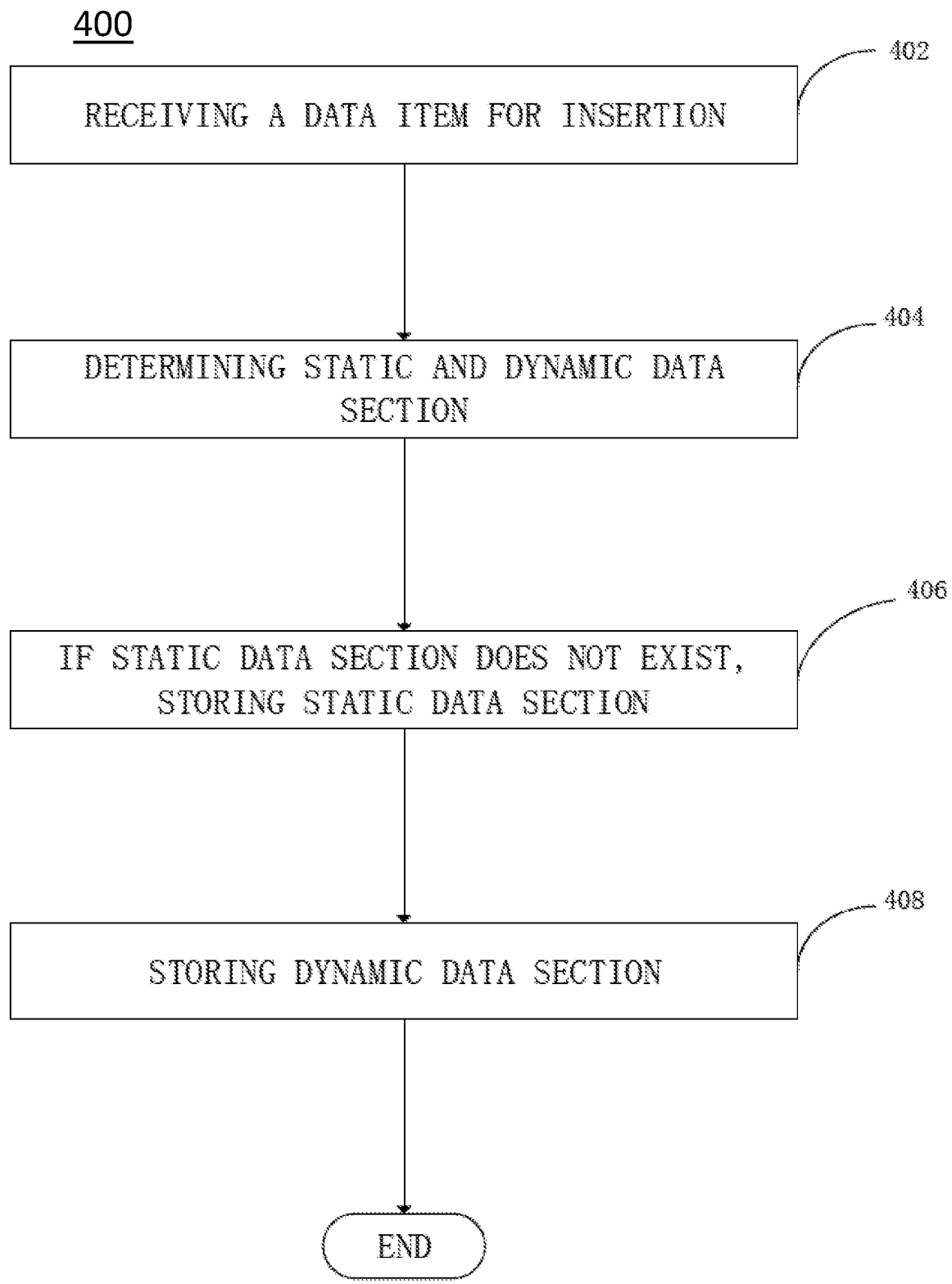
FIG. 4 shows an exemplary flow chart of the process which is applicable to implement the embodiments of the present invention.

With reference now to FIG. 4, an exemplary flow chart of the process 400 which is applicable to implement the embodiments of the present invention is provided. Starting from step 402, a data item to be stored in a table in a non-relational database is received. The data item may be any data record with any specific content to be imported to the table. For example, a PM 2.5 sensor deployed in a station may generate PM 2.5 values every hour, and each of the PM 2.5 values may be deemed as a data item to be stored in a table. The data item contains not only the PM 2.5 value, but also the sensor's identification information such as country, province, city, district, and even the latitude or longitude information of the location where the sensor is deployed.

Now the process 400 moves to step 404, in which the received data item's dynamic data section and static data section are determined. Before the database table is created in the non-relational database, it is determined which data columns in the table are static data sections and which data columns in the table are dynamic data sections. According to an embodiment of the present invention, the data columns with constant data values are determined to be the static data sections. On the contrary, the data columns with dynamic data values are determined to be the dynamic data sections.

For example, referring back to FIG. 2A, the database administrator knows that every sensor station's city, province, station name, county, longitude, and latitude are constant values, so they may be categorized as static data sections. On the contrary, every sensor station's measuring timestamp and corresponding PM 2.5 values may be changing as time goes on, so they may be categorized as dynamic data sections. According to an embodiment of the present invention, a static data storage area in the non-relational database table may be configured to store the static data sections, and a dynamic data storage area in the non-relational database table may be configured to store the dynamic data sections. Since the static data storage area and the dynamic data storage area belong to a same table, all of the static data sections and all of the dynamic data sections of future incoming data items may be stored in the same table.

According to an embodiment of the present invention, in order to determine a dynamic data section and a static data section of the received data item, a pre-defined categorization of a dynamic data section and a static data section, as mentioned in the above paragraph, may be obtained. Based on the obtained pre-defined categorization, the received data item may be analyzed to determine which part of the data item is a static data section and which part of the data item is a dynamic data section.

Once the static data sections and the dynamic data sections have been categorized, each received data item may be analyzed to identify a static data section and a dynamic data section by matching the received data item with the pre-categorized static data sections and pre-categorized dynamic data sections of the table. Based on this run-time matching result, the static data sections and dynamic data sections, of each received data item, may be determined.

Once the static data sections and dynamic data sections, of the received data item, are determined in step 404, the static data sections of the received data item may be stored in the static data storage area of the table, if the static data sections do not exist in the static data storage area in step 406. In other words, if the static data section of a received data item has already been stored in the static data storage area, the static data section is not stored repeatedly, so that data redundancy is reduced.

With continued reference to FIG. 4, in step 408, the dynamic data sections of the received data item may be stored in a dynamic data storage area of the table. According to an embodiment of the present invention, the static data sections and the dynamic data sections, in the same table, have string-type row keys in the same format. The concept of row keys in non-relational databases, and exemplary architecture of Hbase, has been described in above paragraphs with reference to FIG. 3. Row keys are used to uniquely identify and retrieve each data row in a non-relational database, and the row keys' format may be pre-defined as any format with a string type. For example, all the string-type row keys should be in the format of "*-*-*-*", wherein the "*" represents any string characters in any length. The row key for row 1 in the table could be "aaa-bbb-ccc-ddd" and the row key for row 2 in the table could be "ab-ac-bcd-d", meaning the content of row keys may be different but they should all be in the same format.

According to an embodiment of the present invention, in step 406 and step 408, in order to store the static data section in the static data storage area and the dynamic data section in the dynamic storage area, a first row key according to the pre-defined format and content for a row key of static data sections is generated and used to store the static data sections in the static data storage area. Similarly, a second row key according to the pre-defined format and content for a row key of dynamic data sections is generated and used to store the dynamic data section in the dynamic storage area. According to an embodiment of the present invention, the first row key and the second row key are both in string-type, and both have the same format, even though the respective content may be different.

As mentioned above, all static data sections and dynamic data sections of the data item may be stored in the same table in the non-relational database, without being separately stored in two tables like the solution used in the relational database. Additionally, repeated static data sections may only be stored once in the static data storage area, to reduce data redundancy, and back and forth communications between master and slaves in a distributed non-relational database may be avoided during data query processing. It should be emphasized that the process 400 is not necessarily performed in a distributed non-relational database. Even in a non-distributed non-relational database, the process 400 could be implemented with benefits to reduce data redundancy.

Figure 5:
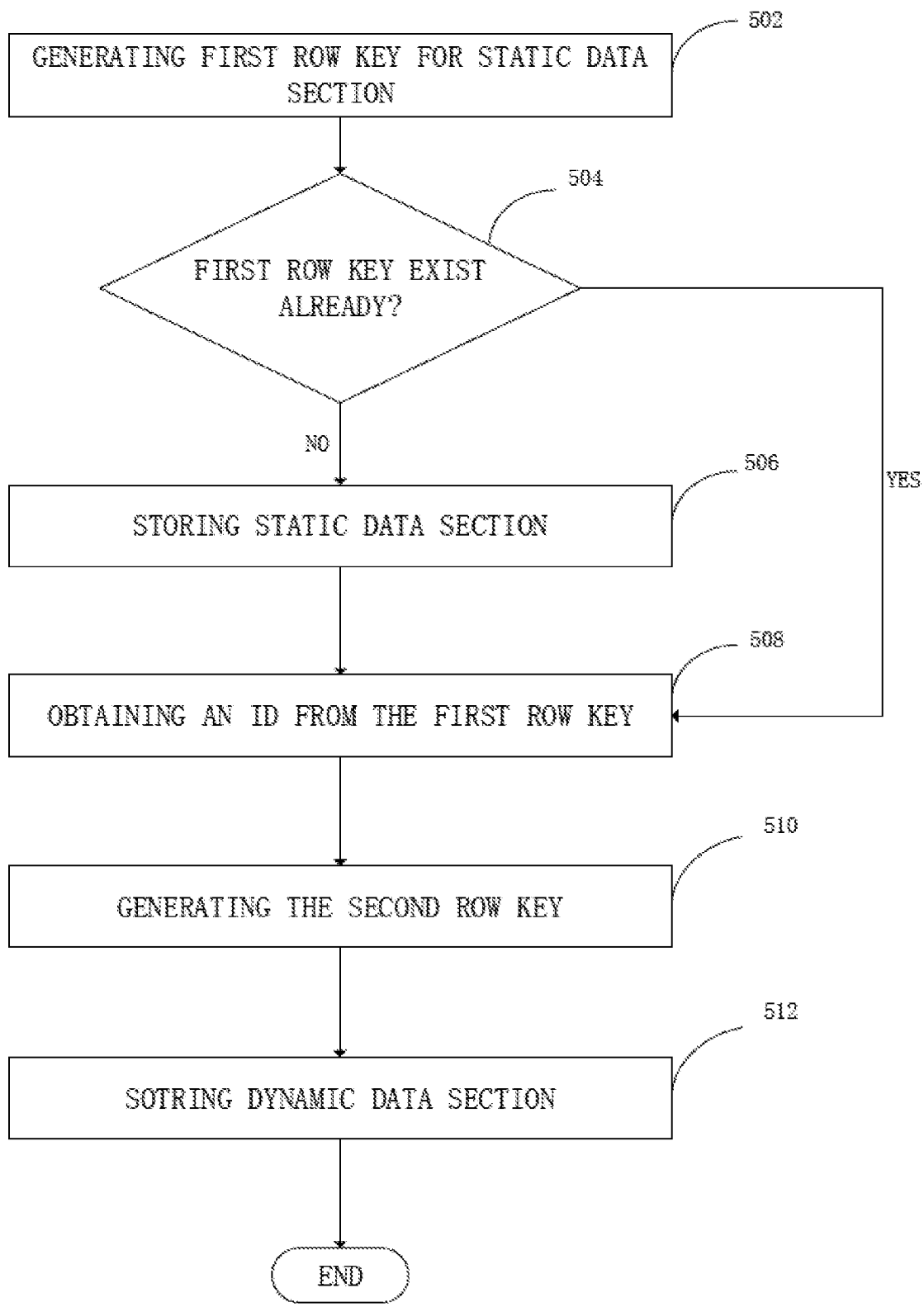
FIG. 5 shows an exemplary flow chart of a further process which is applicable to implement the embodiments of the present invention based on the process shown in FIG. 4.

FIG. 5 depicts a further process based on step 406 and step 408 of FIG. 4. The details of step 406 and step 408 discuss how to generate the first row keys and second row keys in order to store the static data section in a static data storage area and the dynamic data section in a dynamic data storage area Logically, the process 500 depicted in FIG. 5, may be understood as follow-up steps from step 404 in FIG. 4.

In step 502, a first row key for the determined static data section of the received data item in step 404 is generated according to a pre-defined format and content of a row key of static data sections. For example, with reference to FIG. 2A, the data information about "city", "province", "county", "longitude", "latitude", "station name" and "ID" are the static data sections. As such, before any data item is inserted into the table, it can first be determined that the row key for the static data sections may be "city-province-county-station name" In other words, for any data item to be inserted into the table later, its static data section can be analyzed to extract the information about "province", "city", "county" and "station name", and the extracted information will be constructed to form the row key according to the format and content of "province-city-county-station name".

It may be understood that this is only an example of the pre-defined format and content of row keys for static data sections. Those skilled in the art will be able to generate other type of row key formats and content for static data sections, as long as the row keys can uniquely identify the sensor. For example, if the longitude and latitude information can uniquely identify the sensor as well, we may use "longitude-latitude" as the pre-defined format and content of row keys for static data sections. Accordingly, for any new data item to be inserted into the table, its static data sections can be analyzed to extract the information about "longitude" and "latitude" in order to form the row keys according to the format and content of "longitude-latitude".

With continued reference to FIG. 5, the process 500 moves to step 504. In step 504, a determination is made as to whether the first row key exists in the static data storage area or not. If the first row key exists in the static data storage area, that means the static data sections have already been stored in the table so there is no need to store it again. As such, the process 500 will directly move to step 508, which will be described below.

If the first row key does not exist in the static data storage area, that means the static data section of the received data item has not been stored in the table. As such, the static data section needs to be stored now. It should be understood that the determination in step 504 may simply be performed through existing string comparison measures known to one of ordinary skill in the art. In step 506, in response to the first row key not existing in the static data storage area, the determined static data sections of the received data item are stored in the static data storage area with the first row key.

With continued reference to FIG. 5, in another branch based on the determination in step 504, or after step 506 in which the first row key is stored in the static data storage area, the process moves to step 508. In step 508, the ID will be obtained from the first row key in the static storage area. The ID is used to associate the static data section with the dynamic data section, and it may also be understood that the ID is used to associate the first row key in the static data storage area and the second row key in the dynamic data storage area, because in the non-relational database each data row is uniquely identified by the row key. According to an embodiment of the present invention, the ID is contained in a data cell in the data row identified by the first row key.

As such, this ID may be obtained from the data row identified by the first row key.

In exemplary embodiments, there may be various ways to generate the ID. According to an embodiment under the present invention, an ID could be given in the order of appearance of the first row keys stored in the table's static data storage area. According to another embodiment under the present invention, an ID could be generated based on the counting of a timer when storing the first row keys. Those skilled in the art shall understand that the present invention does not restrict specific ways to generate the ID. As long as any information that may uniquely identify a data row in the static data storage area, that information may be used as an ID mentioned in the present information.

Once the ID is obtained in step 508, the process 500 moves to step 510. In step 510, a second row key is generated for the determined dynamic data section of the received data item, according to a pre-defined format and content of a row key for dynamic data sections in the table. Basically, the pre-defined format and content for dynamic data sections is similar to the methodology of the pre-defined format and content for static data sections, as mentioned in step 502. For example, in FIG. 2A, the data information of "timestamp" and "PM2.5 value" are both dynamic data sections so the pre-defined format and content of a row key for dynamic data sections could be "timestamp" and the timestamp information could be "2017-06-26 00:00:00-*", so its format is consistent with the row key format for static data section "province-city-county-station name" because there are three "-" characters to separate four strings. However, the last string in the row key format for dynamic data sections, "*", is used to add the ID information obtained in step 508 from the static data sections. In other words, after the ID is obtained in step 508 from static data sections, the ID will be added to the second row key so that the static data section and the dynamic data section may be associated.

Finally, in step 512 of FIG. 5, after the second row key is generated, the determined dynamic data section of the received data item may be stored in the dynamic data storage area with the second row key.

Those skilled in the art should understand that the ID is not necessarily to be obtained from a data cell in the data row identified by the first row key. If the ID is contained in the received data item to be inserted into the table, it may be directly obtained from the data item per se. It should also be emphasized that if the ID can be directly obtained from the data item per se, then steps 508, 510, and 512 are not necessarily performed after steps 502-506, but rather may be performed before or in parallel with steps 502-506.

Steps 502-506, in FIG. 5, could be understood as corresponding to step 406 in FIG. 4, and steps 508-512, in FIG. 5, could be understood as corresponding to step 408 in FIG. 4.

With reference to FIG. 6, an exemplary data schema in Hbase, according to the present invention, is depicted. The exemplary data schema is generated based on the original data table, as shown in FIG. 2A. As shown in FIG. 6, the first two rows are static data sections stored in a static data storage area, and the last four rows are dynamic data sections stored in a dynamic data storage area. The row keys for all of the rows (static data sections and dynamic data sections) are string-type with the same format, i.e. "*-*-*-*", wherein the "*" represents a string in any length. Specifically, the row keys for static data sections are pre-defined as "province-city-county-station name" and the row keys for dynamic data sections are pre-defined as "time-stamp-ID", wherein the timestamp is in "*-*-*" format. Furthermore, there is an ID column in the static data sections and the same ID value is contained in the corresponding row key of dynamic data sections, which may associate the static data sections with the dynamic data sections.

Although FIG. 6 only shows a completed data schema that is generated based on the present invention, those skilled in the art may understand how to insert a new data item based on such new data schema. For example, if another sensor's measuring value at the time of 2017-06-26 02:00:00 is generated by the sensor in Beijing (province)-Beijing (city)-DongCheng (county)-DongSi (station name), then the first row key will be generated from this data item as "Beijing-Bejing-DongCheng-DongSi". It will then be determined that this row key already exists in the static data section of the table, so the static data section of this data item will not be stored again in the static data storage area. The ID value corresponding to the first row key is then obtained, which is 1, as shown in FIG. 6.

With continued reference to FIG. 6, the row key of the dynamic data section (the second row key) is generated based on the ID value and a pre-defined format and content as "2017-06-26 02:00:00-1". This row key will be stored in the dynamic data storage area as the sixth row in the table (which is not shown in FIG. 6) and the corresponding PM 2.5 Value will also be stored in that row. It is apparent from FIG. 6 that the data redundancy is reduced because repeated static data information does not need to be repeatedly stored in the table, and the static data sections and dynamic data sections are both stored in the same table so the back and forth communications between master and slaves, during data query processing in a distributed non-relational database, may be avoided.

Those skilled in the art may understand that the process of data query request may be easily adjusted to accommodate the new data schema under the present invention. To provide a better illustration, the process of data query request will be briefly described.

If a data query request is received, then the data query is first parsed to generate a first sub-query for static data and a second sub-query for dynamic data. For example, with reference to the data table shown in FIG. 6, if a data query request to get the PM 2.5 values of stations in Beijing between 2017-6-26 00:00:00 and 2017-6-26 10:00:00 is received, then it is parsed to generate the first sub-query for static data: all stations in Beijing, and the second sub-query for dynamic data: PM 2.5 values between 2017-6-26 00:00:00 and 2017-6-26 10:00:00. Then, a first temporal result from the table's static data storage area for the first sub-query will be retrieved. In Hbase, "get" method could be used based on the row key of "Beijing-Beijing-*-*" to obtain all the station's ID with province name of Beijing and city name of Beijing. Then, a second temporal result is retrieved from the table's dynamic data storage area for the second sub-query.

According to an embodiment of the present invention, in order to retrieve the second temporal result, the ID contained in the first temporal result is first identified. In this example, the ID is 1. Then, the second temporal result may be retrieved from the table's dynamic data storage area for the second sub-query, based on the identified ID of 1. In other words, two rows in FIG. 6 will be retrieved (i.e. the third and fifth row) because their ID value in the row keys are both 1 and the time stamp also satisfies the query of "between 00:00:00 and 10:00:00". Finally, the first temporal results and the second temporal results are combined to generate a final result for the received data query. The detail process of how to combine the temporal results are existing database operations which will not be introduced in detail here.

It should be understood that although the exemplary data schema shown in FIG. 6 and FIG. 3 are based on Hbase architecture, the present invention is not necessarily restricted to Hbase, but can also be implemented in any other non-relational database, like Mongo DB, as long as the non-relational database supports the row key operation to uniquely identify a data row in the table and the format of the row key can be defined to address different data content, under different data context, so that the static data section and the dynamic data section can be separately stored in a same table. Various pre-defined formats of row keys for static data sections or dynamic data sections may be adopted by those skilled in the art to implement the present invention based on specific database architecture, specific data context and/or specific requirement or limitation on the row key's structure or format.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for data storage in a non-relational database, comprising:
   receiving a data item to be stored in the non-relational database;
   determining a dynamic data section and a static data section of the data item;
   setting a dynamic data storage area for storing the dynamic data section;
   setting a static data storage area for storing the static data section;
   storing the static data section in the static data storage area, in response to the static data section not existing in the static data storage area of the non-relational database; and
   storing the dynamic data section in the dynamic data storage area,
      wherein the dynamic data storage area and the static data storage area belong to a same table in the non-relational database.

2. The computer-implemented method of claim 1, wherein determining the dynamic data section and the static data section comprise:
   obtaining a pre-defined categorization of the dynamic data section and the static data section for the same table,
      wherein the static data section comprises constant data values and the dynamic data section comprises variable data values; and
   analyzing the data item to determine the static data section and the dynamic data section according to the pre-defined categorization.

3. The computer-implemented method of claim 1, wherein storing the static data section in the static data storage area comprises:
   storing the static data section in the static data storage area with a first row key; and
   storing the dynamic data section in the dynamic data storage area with a second row key,
      wherein the first row key and the second row key comprise a string-type with a same format.

4. The computer-implemented method of claim 3, wherein storing the static data section in the static data storage area with the first row key comprises:
   generating the first row key for the static data section of the data item according to a pre-defined format of the first row key and content of the static data section;
   storing the static data section of the data item in the static data storage area with the first row key, in response to the first row key not existing in the static data storage area; and
   not storing the static data section of the data item, in response to the first row key existing in the static data storage area.

5. The computer-implemented method of claim 3, wherein storing the dynamic data section in the dynamic data storage area with the second row key comprises:
   generating the second row key for the dynamic data section of the data item according to a pre-defined format of the second row key and content of the dynamic data section; and
   storing the dynamic data section of the data item in the dynamic data storage area with the second row key.

6. The computer-implemented method of claim 3, further comprising:
   associating the first row key and the second row key with an ID,
      wherein the ID is contained in a data cell of a data row in the second row key, and identified by the first row key.

7. The computer-implemented method of claim 1, further comprising:
   receiving a data query request;
   parsing the data query request to generate a first sub-query for static data and a second sub-query for dynamic data;
   retrieving a first temporal result from the static data storage area for the first sub-query;
   retrieving a second temporal result from the dynamic data storage area for the second sub-query; and
   combining the first temporal result and the second temporal result to generate a final result for the data query request.

8. The computer-implemented method of claim 7, wherein retrieving the second temporal result from the dynamic data storage area for the second sub-query comprises:
   identifying an ID contained in the first temporal result; and
   retrieving the second temporal result from the dynamic data storage area for the second sub-query based on the ID.

9. The computer-implemented method of claim 1, wherein the non-relational database is a distributed non-relational database.

10. A computer system for data storage in a non-relational database, comprising:
   one or more processors;
   a memory coupled to at least one of the one or more processors;
   a set of computer program instructions stored in the memory and executed by at least one of the one or more processors in order to perform actions of:
      receiving a data item to be inserted into a table in the non-relational database;
      determining a dynamic data section and a static data section of the data item;
      setting a dynamic data storage area for storing the dynamic data section;

setting a static data storage area for storing the static data section;

storing the static data section in the static data storage area, in response to the static data section not existing in the static data storage area of the non-relational database; and storing the dynamic data section in the dynamic data storage area, wherein the dynamic data storage area and the static data storage area belong to a same table.

11. The computer system of claim 10, wherein determining the dynamic data section and the static data section comprises:

obtaining a pre-defined categorization of the dynamic data section and the static data section for the table, wherein the static data section comprises constant data values and the dynamic data section comprises variable data values; and analyzing the data item to determine the static data section and the dynamic data section for the data item, according to the pre-defined categorization.

12. The computer system of claim 10, wherein storing the static data section and the dynamic data section comprises:

storing the static data section in the static data storage area with a first row key, according to a pre-defined format and content for a row key of the static data section; and storing the dynamic data section in the dynamic data storage area with a second row key according to a pre-defined format and content for a row key of the dynamic data section, wherein the first row key and the second row key comprise a string-type with a same format.

13. The computer system of claim 12, wherein storing the static data section in the static data storage area with a first row key, comprises:

generating the first row key for the static data section of the data item according to the pre-defined format and the content for the row key of the static data section;

storing the static data section of the data item in the static data storage area with the first row key, in response to the first row key not existing in the static data storage area; and not storing the static data section of the data item, in response to the first row key existing in the static data storage area.

14. The computer system of claim 12, wherein storing the dynamic data section in the dynamic data storage area with a second row key, comprises:

generating the second row key for the dynamic data section of the data item according to the pre-defined format and the content for the row key of the dynamic data section; and storing the dynamic data section of the data item in the dynamic data storage area with the second row key.

15. A computer program product for data storage in a non-relational database, the computer program product comprising a computer readable storage medium having program instructions embodied therewith, wherein the program instructions being executable by a device to perform a method comprising:

receiving a data item to be inserted into a table in the non-relational database;

determining a dynamic data section and a static data section of the data item;

setting a dynamic data storage area for storing the dynamic data section;

setting a static data storage area for storing the static data section;

storing the static data section in the static data storage area, in response to the static data section not existing in the static data storage area of the non-relational database; and storing the dynamic data section in the dynamic data storage area, wherein the dynamic data storage area and the static data storage area belong to a same table.

16. The computer program product of claim 15, wherein determining the dynamic data section and the static data section comprise:

obtaining a pre-defined categorization of the dynamic data section and the static data section for the table, wherein the static data section comprises constant data values and the dynamic data section comprises variable data values; and analyzing the data item to determine the static data section and the dynamic data section for the data item, according to the pre-defined categorization.

17. The computer program product of claim 15, wherein storing the static data section and the dynamic data section, comprises:

storing the static data section in the static data storage area with a first row key according to a pre-defined format and content for a row key of the static data section; and storing the dynamic data section in the dynamic data storage area with a second row key according to a pre-defined format and content for a row key of the dynamic data section, wherein the first row key and the second row key comprise a string-type with a same format.

18. The computer program product of claim 17, wherein storing the static data section in the static data storage area with a first row key, comprises:

generating the first row key for the static data section of the data item according to the pre-defined format and the content of the row key of the static data section;

storing the static data section of the data item in the static data storage area with the first row key, in response to the first row key not existing in the static data storage area; and not storing the static data section of the data item, in response to the first row key existing in the static data storage area.

19. The computer program product of claim 17, wherein storing the dynamic data section in the dynamic data storage area with a second row key according to the pre-defined format and the content for the row key of the dynamic data section comprises:

generating the second row key for the dynamic data section of the data item according to the pre-defined format and the content for the row key of the dynamic data section; and storing the dynamic data section of the data item in the dynamic data storage area with the second row key.

* * * * *